United States Patent
Nonaka et al.

(10) Patent No.: US 10,066,767 B2
(45) Date of Patent: Sep. 4, 2018

(54) METHOD FOR MANUFACTURING A RUBBER HOSE

(71) Applicant: Hitachi Metals, Ltd., Tokyo (JP)

(72) Inventors: Takafumi Nonaka, Bangkok (TH); Tomonori Saito, Hitachi (JP); Tomonori Shibata, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 156 days.

(21) Appl. No.: 14/995,182

(22) Filed: Jan. 13, 2016

(65) Prior Publication Data

US 2016/0131283 A1 May 12, 2016

Related U.S. Application Data

(62) Division of application No. 14/267,473, filed on May 1, 2014, now abandoned.

(30) Foreign Application Priority Data

May 2, 2013 (JP) ................................. 2013-096950

(51) Int. Cl.
| | |
|---|---|
| *F16L 11/00* | (2006.01) |
| *F16L 11/08* | (2006.01) |
| *B29C 47/00* | (2006.01) |
| *B29C 47/02* | (2006.01) |
| *B29C 47/06* | (2006.01) |
| *B29D 23/00* | (2006.01) |
| *B29K 23/00* | (2006.01) |
| *B29K 29/00* | (2006.01) |
| *B29L 23/00* | (2006.01) |

(52) U.S. Cl.
CPC .......... *F16L 11/087* (2013.01); *B29C 47/005* (2013.01); *B29C 47/021* (2013.01); *B29C 47/065* (2013.01); *B29D 23/00* (2013.01); *F16L 11/086* (2013.01); *B29K 2023/16* (2013.01); *B29K 2029/04* (2013.01); *B29L 2023/006* (2013.01)

(58) Field of Classification Search
CPC ....... F16L 11/00; F16L 11/086; B29C 47/005; B29C 47/021; B29C 47/065
USPC .................................................. 138/126, 130
See application file for complete search history.

(56) References Cited

U.S. PATENT DOCUMENTS

| | | |
|---|---|---|
| 3,165,488 A | 1/1965 | Itoi |
| 3,200,178 A | 8/1965 | Matsubayashi et al. |
| 3,234,160 A | 2/1966 | Matsubayashi |
| 5,077,108 A | 12/1991 | Ozawa et al. |

(Continued)

*Primary Examiner* — Vishal Pancholi
(74) *Attorney, Agent, or Firm* — Roberts Mlotkowski Safran Cole & Calderon, P.C.

(57) ABSTRACT

A method of making a rubber hose includes the steps of providing an inner rubber layer including a hollow part, and forming a first braided layer on the inner rubber layer by braiding a plurality of first yarn materials including a vinylon fiber made by a dry process such that the braided first yarn materials includes a braid formed in a three-over, three-under pattern. Next, a middle rubber layer is formed on the first braided layer. A second braided layer is then formed on the middle rubber layer by braiding a plurality of second yarn materials including a vinylon fiber made by a wet process such that the braided second yarn materials includes a braid formed in a two-over, two-under pattern. Finally, an outer rubber layer is formed on the second braided layer.

4 Claims, 2 Drawing Sheets

(56) References Cited

U.S. PATENT DOCUMENTS

| | | |
|---|---|---|
| 6,450,206 B2 | 9/2002 | Ishikawa et al. |
| 7,614,428 B2 | 11/2009 | Henry et al. |
| 7,694,695 B2 | 4/2010 | Johnson et al. |
| 8,227,061 B2 | 7/2012 | Noda et al. |
| 2005/0136203 A1 | 6/2005 | Henry |
| 2008/0210328 A1 | 9/2008 | Henry |
| 2008/0236695 A1 | 10/2008 | Takagi |
| 2010/0282354 A1 | 11/2010 | Polasky |
| 2013/0000767 A1 | 1/2013 | Nonaka et al. |
| 2013/0061974 A1 | 3/2013 | Oyaizu et al. |

METHOD FOR MANUFACTURING A RUBBER HOSE

The present application is a divisional application of Ser. No. 14/267,473 filed May 1, 2014, which is based on Japanese patent application No.2013-096950 filed on May 2, 2013, the entire contents of which are incorporated by reference.

BACKGROUND OF THE INVENTION

1. Field of the Invention

This invention relates to a rubber hose such as a brake hose etc.

2. Description of the Related Art

A brake hose is extremely important to secure the safety of the vehicles and is appointed in the important security parts.

JP-A-2005-180694 discloses a brake hose.

The brake hose disclosed in JP-A-2005-180694 comprises a first core hose layer (tube) inside of which is filled with brake fluid, a first reinforcing member layer provided on the outer periphery on the first core hose layer, a middle hose layer provided on the outer periphery on the first reinforcing member layer, a second reinforcing member layer provided on the outer periphery of the middle hose layer, and an outer hose layer provided on the outer periphery of the second reinforcing member layer, wherein the first reinforcing member layer is constructed by braiding reinforcing yarns in a one-over, one-under pattern, and wherein the second reinforcing member layer is constructed by braiding reinforcing yarns in a three-over, three-under pattern.

The related arts may also include JP-A-2010-515002.

SUMMARY OF THE INVENTION

The brake hose is required to have a durability against the hard mechanical stresses (i.e., durability against a shaking movement) such as a bending, a steering change and a shaking caused by the repeating motion of the vehicle steering wheel, and at the same time required not to grow an expansion quantity in pressurizing (low expansion performance) which is an expansion quantity of a brake hose in applying pressure to brake liquid filled in a hollow part of an inner hose layer.

However, there is a problem that the brake hose disclosed in JP-A-2005-180694 does not provide a high durability against the shaking movement and a low expansion performance It is an object of this invention to provide a rubber hose that allows improvement in durability against a shaking movement and low expansion performance.

(1) According to one embodiment of the invention, a method of making a rubber hose comprises:

providing an inner rubber layer comprising a hollow part;

forming a first braided layer on an outer periphery of the inner rubber layer by braiding a plurality of first yarn materials;

forming a middle rubber layer on an outer periphery of the first braided layer;

forming a second braided layer formed on an outer periphery of the middle rubber layer by braiding a plurality of second yarn materials; and forming an outer rubber layer on an outer periphery of the second braided layer, wherein the first braided layer is formed by braiding the plurality of first yarn materials comprising a vinylon fiber made by a dry process such that the braided first yarn materials comprises a braid formed in a three-over, three-under pattern, and wherein the second braided layer is formed by braiding the plurality of second yarn materials comprising a vinylon fiber made by a wet process such that the braided second yarn materials comprises a braid formed in a two-over, two-under pattern.

In the above embodiment (1) of the invention, the following modifications and changes can be made.

(i) The first yarn materials and the second yarn materials comprise a bundled yarn with two or three wound yarns.

(ii) The inner rubber layer and the outer rubber layer comprise EPDM.

Effects of the Invention

According to one embodiment of the invention, a rubber hose can be provided that allows improvement in durability against a shaking movement and low expansion performance.

BRIEF DESCRIPTION OF THE DRAWINGS

The preferred embodiments according to the invention will be explained below referring to the drawings, wherein:

FIGS. 2A and 2B are views schematically showing the details of the braided layers of a rubber hose according to an embodiment of this invention, wherein FIG. 1A is a view schematically showing the first braided layer (with a braid formed in a three-over, three-under pattern), and FIG. 1B is a view schematically showing the second braided layer (with a braid formed in a two-over, two-under)

DESCRIPTION OF THE PREFERRED EMBODIMENTS

The preferred embodiment of this invention will be explained below referring to the figures attached.

Figure 1:
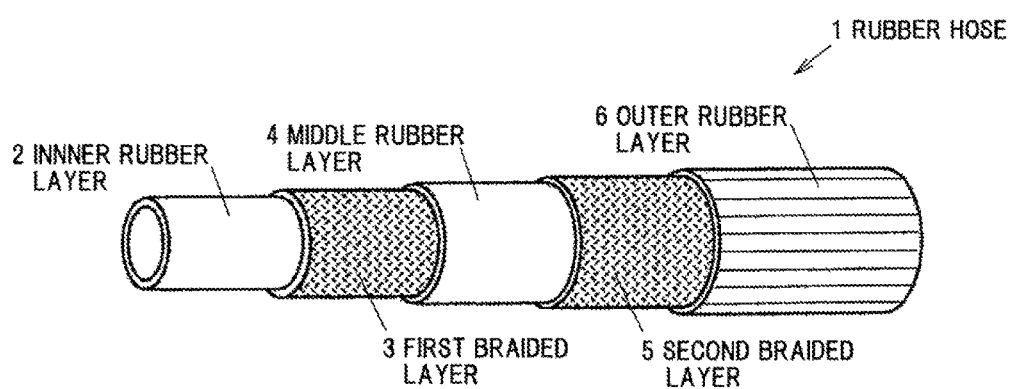
FIG. 1 is a total view schematically showing a rubber hose according to an embodiment of this invention.

As shown in FIG. 1, a rubber hose 1 according to an embodiment of this invention comprises an inner rubber layer 2 inside of which a hollow part is formed along the longitudinal direction, a first braided layer 3 provided on the outer periphery on the inner rubber layer 2 and formed by braiding the plural first yarn materials, a middle rubber layer 4 provided on the outer periphery on the first braided layer 3, a second braided layer 5 provided on the outer periphery on the middle rubber layer 4 and formed by braiding the plural second yarn materials, and an outer rubber layer 6 provided on the outer periphery on the second braided layer 5.

It is preferable that the inner rubber layer 2 and the outer rubber layer 6 is formed of ethylene propylene diene rubber (EPDM), and other than the EPDM, chloroprene rubber (CR), natural rubber (NR), styrene-butadiene rubber (SBR), isobutylene rubber (IIR), and chlorosulfonated polyethylene rubber (CSM) are used depending on the characteristics. Besides, a filler, a cross-linking agent, a reinforcing agent, a plasticizer, a cross-linking assistant, an activator, an anti scorching agent, and an oxidation inhibitor may be property added to the rubbers, and a vulcanizing agent, a vulcanization accelerator, and a vulcanization assistant, etc., may be added to a vulcanized rubber as needed.

In addition, the inner rubber layer 2 and the outer rubber layer 6 made of EPDM are excellent in heat resistance, cold resistance, ozone resistance, and light resistance caused by the molecular structure of EPDM. The EPDM is most suitable as a stuff of a brake hose because it is a low polarity polymer and at a low risk of corroding metal fitting parts.

Figure 2A:
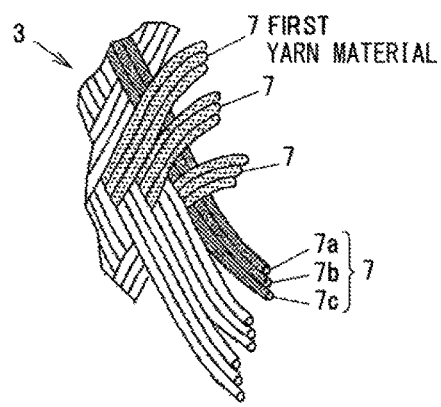

FIG. 2A shows the details of the first braided layer 3, and the first braided layer 3 is constructed by braiding plural first yarn materials 7, which are each formed of vinylon fibers manufactured by a dry process, in a three-over, three-under pattern. The first yarn materials 7 shown in FIG. 2A are each formed of a bundled yarn with three wound yarns 7a, 7b, and 7c bundled collectively, but it may be formed of a bundled yarn with two wound yarns bundled collectively. The first yarn materials 7 are braided such that vertical first yarn materials 7 and horizontal first yarn materials 7 are crossed each other so that at the crossing part three units of the vertical or horizontal first yarn materials 7 pass over the horizontal or vertical first yarn materials 7 respectively (3-over), and that at the next crossing part three units of the horizontal or vertical first yarn materials 7 pass under the vertical or horizontal first yarn materials 7 respectively (3-under).

Figure 2B:
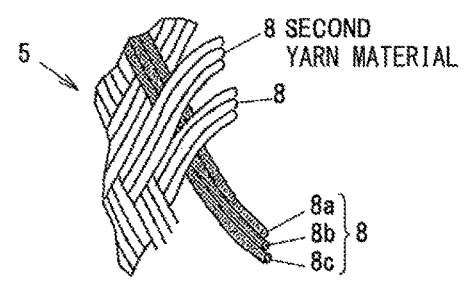

FIG. 2B shows the details of the second braided layer 5, and the second braided layer 5 is constructed by braiding plural second yarn materials 8, which are each formed of vinylon fibers manufactured by a wet process, in a two-over, two-under pattern. The second yarn materials 8 shown in FIG. 2B are each formed of a bundled yarn with three wound yarns 8a, 8b, and 8c bundled collectively, but it may be formed of a bundled yarn with two yarns bundled collectively. The second yarn materials 8 are braided such that the vertical second yarn materials 8 and the horizontal second yarn materials 8 are crossed each other so that at the crossing part two units of the vertical or horizontal second yarn materials 8 pass over the horizontal or vertical second yarn materials 8 respectively (2-over) and at the next crossing part two units of the horizontal or vertical second yarn materials 8 pass under the vertical or horizontal second yarn materials 8 respectively (2-under).

The three wound yarns 7a, 7b, and 7c composing the first yarn material 7 of the first braided layer 3 are formed a vinylon fiber manufactured by the dry process, more specifically, a vinylon fiber fibrosed by the process that a vinylon polymer dissolved in a volatile spinning solution is spat from a nozzle and simultaneously heated so as to vaporize the volatile spinning solution. The three wound yarns 8a, 8b, and 8c composing the second yarn material 8 of the second braided layer 5 are formed of a vinylon fiber manufactured by the wet process, more specifically, a vinylon fiber fibrosed by the process that a vinylon polymer dissolved in the spinning solution is spat from a nozzle in a liquid. The vinylon fiber manufactured by the wet process can have a high tensile strength and a small elongation to a load because the wet process enables to control the molecular orientation of vinylon polymer in a high degree by extruding the spinning solution to a liquid (solidification liquid). Thus, the vinylon fiber manufactured by the wet process can exhibit a low expansion performance and a high tensile strength of a hose.

Reducing a total fineness (or total fiber fineness/denier) in addition to applying the three-over, three-under braid pattern to the first braided layer 3 and applying the vinylon fibers manufactured by the wet process to the second braided layer 5 having only a small influence on the durability can provide a hose having a further low expansion. This is because the tension applied to the yarn is varied by (or proportional to) the inner pressure multiplied by the perimeter or cross section. Therefore the tension applied to one yarn at the same inner diameter decreases according as the outer diameter decreases. Thereby, the elongation of the yarn decreases and results in a small expansion of the hose.

Meanwhile, even if the total fineness is reduced, a reduction in the tensile strength can be minimized by using the vinylon fibers with a high tensile strength manufactured by the wet process.

As mentioned above, the increment of manufacturing cost can be lowered by reducing the total fineness even when the costly vinylon fibers manufactured by the wet process are used.

EXAMPLES

Example 1 as a preferred embodiment of this invention will be described below in conjunction with Comparative Examples 1 to 3.

The materials of the hoses in Example 1 and Comparative Examples 1 to 3, and the experiment results of the hoses are shown in Table 1 below.

TABLE 1

| | | | Example 1 | Comparative Example 1 | Comparative Example 2 | Comparative Example 3 |
|---|---|---|---|---|---|---|
| Specification of hose | Inner rubber layer | Kind of rubber | EPDM | EPDM | EPDM | EPDM |
| | First braided layer | Kind of yarn | Dry process vinylon | Dry process vinylon | Dry process vinylon | Wet process vinylon |
| | | Elongation rate of a yarn at load of 10N (%) | 0.55 | 0.55 | 0.55 | 0.50 |
| | | Total fineness | 52,800 | 52,800 | 52,800 | 52,800 |
| | | Braiding method | 3-over, 3-under | 2-over, 2-under | 2-over, 2-under | 3-over, 3-under |
| | Middle rubber layer | Kind of rubber | EPDM | EPDM | EPDM | EPDM |
| | Second braided layer | Kind of yarn | Wet process-vinylon | Dry process-vinylon | Dry process-vinylon | Wet process-vinylon |
| | | Elongation rate of a yarn at load of 10N (%) | 0.50 | 0.55 | 0.55 | 0.50 |
| | | Total fineness | 63,840 | 95,760 | 63,840 | 95,760 |

TABLE 1-continued

|  |  | Example 1 | Comparative Example 1 | Comparative Example 2 | Comparative Example 3 |
|---|---|---|---|---|---|
| Outer rubber layer | Braiding method | 2-over, 2-under | 2-over, 2-under | 2-over, 2-under | 2-over, 2-under |
|  | Kind of rubber | EPDM | EPDM | EPDM | EPDM |
| Performance of hose | Expansion quantity (ml/305 mm) | 0.087 | 0.129 | 0.119 | 0.095 |
|  | Number of durability (times) | 700,000 | 800,000 | 700,000 | 200,000 |
|  | Tensile strength | 2,800 | 2,800 | 2,600 | 3,000 |

The hose of Example 1 comprising the materials described in Table 1 was manufactured such that the inner rubber layer is first extruded on the mandrel, the first braided layer is then formed on the outer periphery of the inner rubber layer by braiding, the middle rubber layer is then formed on the outer periphery of the first braided layer, the second braided layer is then formed on the outer periphery of the middle rubber layer by braiding, the outer rubber layer is then formed on the outer periphery of the second braided layer by extrusion, and the vulcanization is finally conducted to obtain the hose. The hoses of Comparative Example 1 to 3 comprising the materials described in Table 1 were manufactured by the same process as Example 1.

The examinations of expansion quantity, durability, and tensile strength were carried out for the hoses manufactured by the processes, after cutting the hoses to the prescribed lengths.

Figure 3:
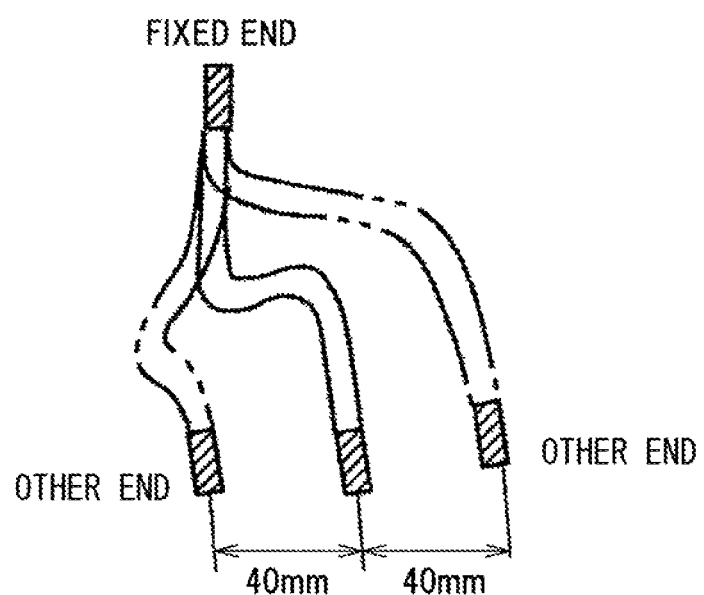
FIG. 3 is a view schematically explaining the examination of bending durability of a rubber hose according to an embodiment of this invention.

The examination of the durability was carried out by the following method by using a bending testing machine (model number: V270-2) from Sum Electro Mechanics Co., LTD. A brake fluid (JIS K2233) is filled in a hollow part of a brake hose, the hose is attached to a system for repeatedly applying pressures of 0 MPa and 9.8 MPa thereto, and the atmosphere temperature is adjusted to 100° C. Then, as shown in FIG. 3, fixing one end of the hose, bending strokes of ±40 mm at a frequency of 1.66 Hz are applied to the other end of the hose. Herein, the number of bending strokes until the hose is damaged is defined as the number of durability. Meanwhile, the hose was attached at the time of the examination in a layout to cause simultaneously the bending and twisting of the hose.

The elongation rate of the yarn at a load of 10N is an index assuming that a hose is pressurized at 10 MPa, and multiple wound yarns of 1330 dtex in fineness were used for the measurement thereof. From the results shown in Table 1, it is proved by comparing Comparative Example 1 and Comparative Example 2 that a reduction in the total fineness of the second braided layer causes a reduction in the expansion quantity, and by comparing Comparative Example 1 with Comparative Example 3 that a low elongation rate of a yarn at a load of 10N causes a low expansion quantity, but results in a low durability.

In comparing Example 1 and Comparative Examples 1 to 3 shown in Table 1, it is proved that the tensile strength tends to increase when the elongation rate of a yarn at a load of 10N is small and the total fineness is large.

Thus the hose of Example 1 as an embodiment of this invention is such a hose that can controls the reduction of the tensile strength to a minimum in spite of the reduction of the total fineness, and has the ultralow expansion quantity performance not more than 0.090 ml/305 mm (0.087 ml/305 mm in Example 1), and keeps the durability not less than 600,000 times (700,000 times in Example 1).

As described above, this invention can realize the ultralow expansion quantity performance by using the three-over, three-under braid pattern to the braiding method of the first braiding layer. Besides, this invention can achieve the further low expansion quantity performance and minimize the reduction of the tensile strength in spite of the reduction of the total fineness by using the vinylon fibers manufactured by the wet process to the second braided layer having only a small influence on the durability and by reducing the median diameter of the braided layer by reducing the total fineness.

Furthermore, with regard to the facility for manufacturing the hoses of the invention, only the length of deflector which controls the method of braiding the first braided layer is needed to be changed. Therefore, the manufacturing cost of the hose can be prevented from increasing. Thus the invention is extremely practical.

Although this invention has been described with respect to the specific embodiments and examples, this invention should not be restricted within the range described above and it should be noted that this invention would be variously changeable within the scope of the description of the claims.

What is claimed is:
1. A method of making a rubber hose, comprising;
providing an inner rubber layer including a hollow part;
forming a first braided layer on an outer periphery of the inner rubber layer by braiding a plurality of first yarn materials including a vinylon fiber made by a dry process such that the braided first yarn materials comprise a braid formed in a three-over, three-under pattern;
forming a middle rubber layer on an outer periphery of the first braided layer;
forming a second braided layer on an outer periphery of the middle rubber layer by braiding a plurality of second yarn materials including a vinylon fiber made by a wet process such that the braided second yarn materials comprise a braid formed in a two-over, two-under pattern, and
forming an outer rubber layer on an outer periphery of the second braided layer,
such that the resulting hose has expansion quantity performance in pressurizing of not more than 0.090 ml/305 mm and bending durability of not less than 600,000 times.
2. The method of making a rubber hose according to claim 1, wherein the first yarn materials and the second yarn materials comprise a bundled yarn with two or three wound yarns.

3. The method of making a rubber hose according to claim 1, wherein the inner rubber layer and the outer rubber layer comprise EPDM.

4. The method of making a rubber hose according to claim 1, wherein the first braided layer is formed by braiding the plurality of first yarn materials comprising a vinylon fiber fibrosed by a dry process wherein a vinylon polymer dissolved in a volatile spinning solution is spat from a nozzle and simultaneously heated so as to vaporize the volatile spinning solution such that the braided first yarn materials comprise a braid formed in a three-over, three-under pattern.

* * * * *